(12) United States Patent
Liu et al.

(10) Patent No.: US 12,669,036 B2
(45) Date of Patent: Jun. 30, 2026

(54) SYSTEMS AND METHODS FOR ENHANCING CARBON DIOXIDE INJECTIVITY INTO A SUBTERRANEAN FORMATION

(71) Applicant: Saudi Arabian Oil Company, Dhahran (SA)

(72) Inventors: Hui-Hai Liu, Katy, TX (US); Yanhui Han, Houston, TX (US)

(73) Assignee: Saudi Arabian Oil Company, Dhahran (SA)

( * ) Notice: Subject to any disclaimer, the term of this patent is extended or adjusted under 35 U.S.C. 154(b) by 285 days.

(21) Appl. No.: 18/237,862

(22) Filed: Aug. 24, 2023

(65) Prior Publication Data

US 2025/0067152 A1 Feb. 27, 2025

(51) Int. Cl.
*E21B 49/00* (2006.01)
*B65G 5/00* (2006.01)
*E21B 41/00* (2006.01)

(52) U.S. Cl.
CPC ............ *E21B 41/0064* (2013.01); *B65G 5/00* (2013.01); *E21B 49/00* (2013.01)

(58) Field of Classification Search
CPC ........ E21B 41/0064; E21B 49/00; B65G 5/00
See application file for complete search history.

(56) References Cited

U.S. PATENT DOCUMENTS

| | | | |
|---|---|---|---|
| 7,726,402 B2 | 6/2010 | Ramakrishnan et al. | |
| 8,454,268 B2 | 6/2013 | Wilkinson | |
| 11,353,621 B2 | 6/2022 | Khan et al. | |
| 2010/0116511 A1* | 5/2010 | Ramakrishnan ...... | E21B 43/164 |
| | | | 166/400 |
| 2013/0259575 A1* | 10/2013 | Hoier .................. | E21B 41/0064 |
| | | | 405/129.35 |
| 2019/0309611 A1* | 10/2019 | Liang ........................ | C09K 8/70 |
| 2023/0184614 A1 | 6/2023 | Zhang et al. | |
| 2023/0294038 A1* | 9/2023 | Wallace .................. | C01B 3/025 |
| | | | 96/234 |
| 2024/0093576 A1* | 3/2024 | Al-Qasim ............... | C04B 28/24 |

OTHER PUBLICATIONS

Gao et al., "Cap rock $CO_2$ breakthrough pressure measurement apparatus and application in Shenhua CCS project," Energy Procedia, 2014, 63:4766-4772, 7 pages.
He et al., "CO2 Storage Capacity Prediction in Deep Saline Aquifers: Uncertainty and Global Sensitivity Analysis," 2022 International Petroleum Technology Conference, Feb. 2022, 16 pages.

(Continued)

*Primary Examiner* — Silvana C Runyan
(74) *Attorney, Agent, or Firm* — Fish & Richardson P.C.

(57) ABSTRACT

A method includes identifying a wellbore that extends from a terranean surface and to a subterranean formation that includes a saline aquifer; injecting, through the wellbore, a predetermined volume of freshwater into a portion of the saline aquifer adjacent the wellbore to create a freshwater ring about the wellbore in the subterranean formation; and subsequent to injecting the predetermined volume of freshwater, injecting a carbon dioxide fluid, through the wellbore, and into the subterranean formation for sequestration.

26 Claims, 4 Drawing Sheets

(56) References Cited

OTHER PUBLICATIONS

Hongjun et al., "Sensitivity Analysis of $CO_2$ Sequestration in Saline Aquifers," Pet. Sci., Aug. 2010, 7(1):372-378, 7 pages.

Luo et al., "Review of $CO_2$ sequestration mechanism in saline aquifers," Natural Gas Industry B, Jul. 2022, 383-393, 11 pages.

Teng et al., "Temperature effect on non-Darcian flow in low-permeability porous media," Arxiv, Aug. 2022, 16 pages.

Yarushina et al., "Potential leakage mechanisms and their relevance to $CO_2$ storage site risk assessment and safe operations," FME Success, Synthesis report vol. 2, Mar. 2018, 32 pages.

Zhang et al., Porosity-permeability relationships in modeling salt precipitation during $CO_2$ sequestration: Review of conceptual models and implementation in numerical simulations. International Journal of Greenhouse Gas Control, Jun. 2016, 52, 24-31, 8 pages.

* cited by examiner

10

15

19

12

25

30

20

44

35

17

42

Uphole

Downhole

60

55

40

41

SYSTEMS AND METHODS FOR ENHANCING CARBON DIOXIDE INJECTIVITY INTO A SUBTERRANEAN FORMATION

TECHNICAL FIELD

This disclosure relates to systems and methods for enhancing carbon dioxide injectivity into a subterranean formation, such as a subterranean saline aquifer.

BACKGROUND

Carbon dioxide ($CO_2$) geological sequestration has played an important role for energy transition in the hydrocarbon industry. Because deep saline aquifers have relatively large storage capacity, they are being considered as a target formation for $CO_2$ injection in many places in the world. One of the critical operation parameters for $CO_2$ geological sequestration in saline aquifers is well injectivity, which is a measure of how easily $CO_2$ can be injected into a subterranean formation and largely determined by a formation permeability and its evolution near the injecting wellbore. A phenomenon called the $CO_2$ dry out effect can reduce well injectivity.

SUMMARY

In an example implementation, a method includes identifying a wellbore that extends from a terranean surface and to a subterranean formation that includes a saline aquifer; injecting, through the wellbore, a predetermined volume of freshwater into a portion of the saline aquifer adjacent the wellbore to create a freshwater ring about the wellbore in the subterranean formation; and subsequent to injecting the predetermined volume of freshwater, injecting a carbon dioxide ($CO_2$) fluid, through the wellbore, and into the subterranean formation for sequestration.

An aspect combinable with the example implementation further includes drilling the wellbore from the terranean surface to the subterranean formation.

In another aspect combinable with any of the previous aspects, injecting the $CO_2$ fluid occurs prior to substantial mixing of the predetermined volume of freshwater with a brine fluid in the saline aquifer.

Another aspect combinable with any of the previous aspects further includes deriving the volume of freshwater by desalting at least a portion of the brine fluid that is pumped from the saline aquifer.

Another aspect combinable with any of the previous aspects further includes determining the volume of freshwater based on a plurality of geometric characteristics of the wellbore and the subterranean formation.

In another aspect combinable with any of the previous aspects, the plurality of geometric characteristics of the wellbore and the subterranean formation include a geometric characteristic of the wellbore, a first geometric characteristic of the subterranean formation, and a second geometric characteristic of the subterranean formation.

In another aspect combinable with any of the previous aspects, the geometric characteristic of the wellbore includes a radius of the wellbore, a first geometric characteristic of the subterranean formation includes a radius of the freshwater ring, and the second geometric characteristic of the subterranean formation includes a thickness of the subterranean formation.

In another aspect combinable with any of the previous aspects, determining the volume of freshwater includes solving $$V_f = \pi r_w^2 H(n^2 - 1),$$

where $V_f$ is the volume of freshwater, $r_w$ is the radius of the wellbore, H is the thickness of the subterranean formation, and n is a ratio of the radius of the wellbore to the radius of the freshwater ring.

In another aspect combinable with any of the previous aspects, n is a dimensionless number between 3 and 7.

Another aspect combinable with any of the previous aspects further includes calculating an injectivity ratio as a function of n, where the injectivity ratio is a measure of an ease of injection of the $CO_2$ fluid into the subterranean formation subsequent to injecting the predetermined volume of freshwater to an ease of injection of a $CO_2$ fluid into the subterranean formation exclusive of injecting the predetermined volume of freshwater.

In another aspect combinable with any of the previous aspects, calculating the injectivity ratio includes solving $$\text{injectivity ratio} = \frac{I^*}{I} = \frac{\frac{K}{K_f}\ln\left(\frac{r_f}{r_w}\right) + \ln\left(\frac{r_p}{r_f}\right)}{\ln\left(\frac{r_p}{r_w}\right)},$$

where $I^*$ is the ease of injection of the $CO_2$ fluid into the subterranean formation subsequent to injecting the predetermined volume of freshwater, I is the ease of injection of a $CO_2$ fluid into the subterranean formation exclusive of injecting the predetermined volume of freshwater, K is a conductivity of the subterranean formation adjusted for a $CO_2$-dryout effect, $K_f$ is a conductivity of the subterranean formation, and $r_p$ is a radial distance from a radial center of the wellbore to a point in the subterranean formation.

In another aspect combinable with any of the previous aspects, $K_f/K$ is a dimensionless number between 2 and 10, and $r_p/r_w$ is a dimensionless number of 10.

In another aspect combinable with any of the previous aspects, the $CO_2$ fluid is supercritical $CO_2$.

In another example implementation, a system includes a freshwater circulation system configured to circulate freshwater into a wellbore formed from a terranean surface and to a subterranean formation that includes a saline aquifer; a carbon dioxide ($CO_2$) circulation system configured to circulate a $CO_2$ fluid into the wellbore and to the subterranean formation; and a control system configured to perform operations. The operations include determining a volume of freshwater sufficient to create a freshwater ring about the wellbore in the subterranean formation; causing the freshwater circulation system to circulate the determined volume of freshwater into the subterranean formation; and causing the $CO_2$ circulation system to circulate, subsequent to circulation of the determined volume of freshwater, an amount of the $CO_2$ fluid into the subterranean formation for sequestration.

In an aspect combinable with the example implementation, the control system causes the $CO_2$ circulation system to circulate the amount of $CO_2$ fluid into the subterranean formation prior to substantial mixing of the determined volume of freshwater with a brine fluid in the saline aquifer.

In another aspect combinable with any of the previous aspects, the volume of freshwater is derived by desalting at least a portion of the brine fluid that is pumped from the saline aquifer.

In another aspect combinable with any of the previous aspects, the operation of determining the volume of freshwater includes determining the volume of freshwater based on a plurality of geometric characteristics of the wellbore and the subterranean formation.

In another aspect combinable with any of the previous aspects, the plurality of geometric characteristics of the wellbore and the subterranean formation include a geometric characteristic of the wellbore, a first geometric characteristic of the subterranean formation, and a second geometric characteristic of the subterranean formation.

In another aspect combinable with any of the previous aspects, the geometric characteristic of the wellbore includes a radius of the wellbore, a first geometric characteristic of the subterranean formation includes a radius of the freshwater ring, and the second geometric characteristic of the subterranean formation includes a thickness of the subterranean formation.

In another aspect combinable with any of the previous aspects, the operation of determining the volume of freshwater includes solving $$V_f = \pi r_w^2 H(n^2 - 1),$$

where $V_f$ is the volume of freshwater, $r_w$ is the radius of the wellbore, H is the thickness of the subterranean formation, and n is a ratio of the radius of the wellbore to the radius of the freshwater ring.

In another aspect combinable with any of the previous aspects, n is a dimensionless number between 3 and 7.

In another aspect combinable with any of the previous aspects, the operations further include calculating an injectivity ratio as a function of n, where the injectivity ratio is a measure of an ease of injection of the $CO_2$ fluid into the subterranean formation subsequent to injecting the predetermined volume of freshwater to an ease of injection of a $CO_2$ fluid into the subterranean formation exclusive of injecting the predetermined volume of freshwater.

In another aspect combinable with any of the previous aspects, calculating the injectivity ratio includes solving $$\text{injectivity ratio} = \frac{I^*}{I} = \frac{\frac{K}{K_f}\ln\left(\frac{r_f}{r_w}\right) + \ln\left(\frac{r_p}{r_f}\right)}{\ln\left(\frac{r_p}{r_w}\right)},$$

where $I^*$ is the ease of injection of the $CO_2$ fluid into the subterranean formation subsequent to injecting the predetermined volume of freshwater, I is the ease of injection of a $CO_2$ fluid into the subterranean formation exclusive of injecting the predetermined volume of freshwater, K is a conductivity of the subterranean formation adjusted for a $CO_2$-dryout effect, $K_f$ is a conductivity of the subterranean formation, and $r_p$ is a radial distance from a radial center of the wellbore to a point in the subterranean formation.

In another aspect combinable with any of the previous aspects, $K_f/K$ is a dimensionless number between 2 and 10, and $r_p/r_w$ is a dimensionless number of 10.

In another aspect combinable with any of the previous aspects, the $CO_2$ fluid is supercritical $CO_2$.

Implementations of a systems and methods for carbon dioxide sequestration though well injection according to the present disclosure may include one or more of the following features. For example, implementations according to the present disclosure can increate a rate and effectiveness of carbon dioxide into a subterranean formation, such as a formation that includes a saline aquifer. As another example, implementations according to the present disclosure can reduce or eliminate a carbon dioxide dry out effect that occurs during carbon dioxide sequestration and thus maintain the well injectivity for $CO_2$ injection.

The details of one or more implementations of the subject matter described in this disclosure are set forth in the accompanying drawings and the description below. Other features, aspects, and advantages of the subject matter will become apparent from the description, the drawings, and the claims.

DETAILED DESCRIPTION

The present disclosure describes implementations of a well injection system that is operable to inject freshwater and supercritical carbon dioxide ($CO_2$) into a subterranean formation for the ultimate goal of sequestering the $CO_2$ in the formation (for temporary or permanent storage). In some aspects, as note, supercritical $CO_2$ can be injected into the subterranean formation for storage. However, when supercritical $CO_2$ is injected into subterranean formation that includes a saline aquifer, water (in the saline liquid that also includes salt) near the wellbore in the aquifer evaporates into the injected $CO_2$ phase and consequently, the salt in the brine precipitates and plugs pores of the subterranean formation. The plugging of pores by the precipitated salt can significantly reduce formation permeability near the wellbore, which in turn, limits an amount of $CO_2$ that can be injected into the formation and sequestered. This injectivity reduction mechanism has been observed in a number of core-flooding laboratory experiments, and this reduction in permeability can be more than 50% to almost 100%.

Implementations of the well injection system inject or circulate an amount of freshwater into the subterranean formation through the wellbore prior to injection of the $CO_2$ for sequestration purposes. The freshwater injection minimizes the negative impact of $CO_2$ dry-out on permeability through the displacement of brine near the wellbore with the injected freshwater. In some aspects, the injected freshwater is obtained by desalting a brine that is pumped from a saline aquifer in the subterranean formation. Although some $CO_2$ dry-out may still occur after the injection of the freshwater, the precipitation of salt from the brine near wellbore is reduced due to the reduced amount of solute (salt) available for precipitation into the supercritical $CO_2$.

The amount of freshwater can be determined prior to injection so that the efficiency of the well injection system is maximized, taking into account availability of freshwater at the wellbore, cost of freshwater injection, and amount of pore space in the subterranean formation that, if not filled with freshwater, would otherwise be filled with sequestered $CO_2$. In some aspects, the well system can determine and inject an amount of freshwater that optimizes well injectivity of $CO_2$ relative to an amount of $CO_2$ that would be injected absent the injection of freshwater.

Figure 1:
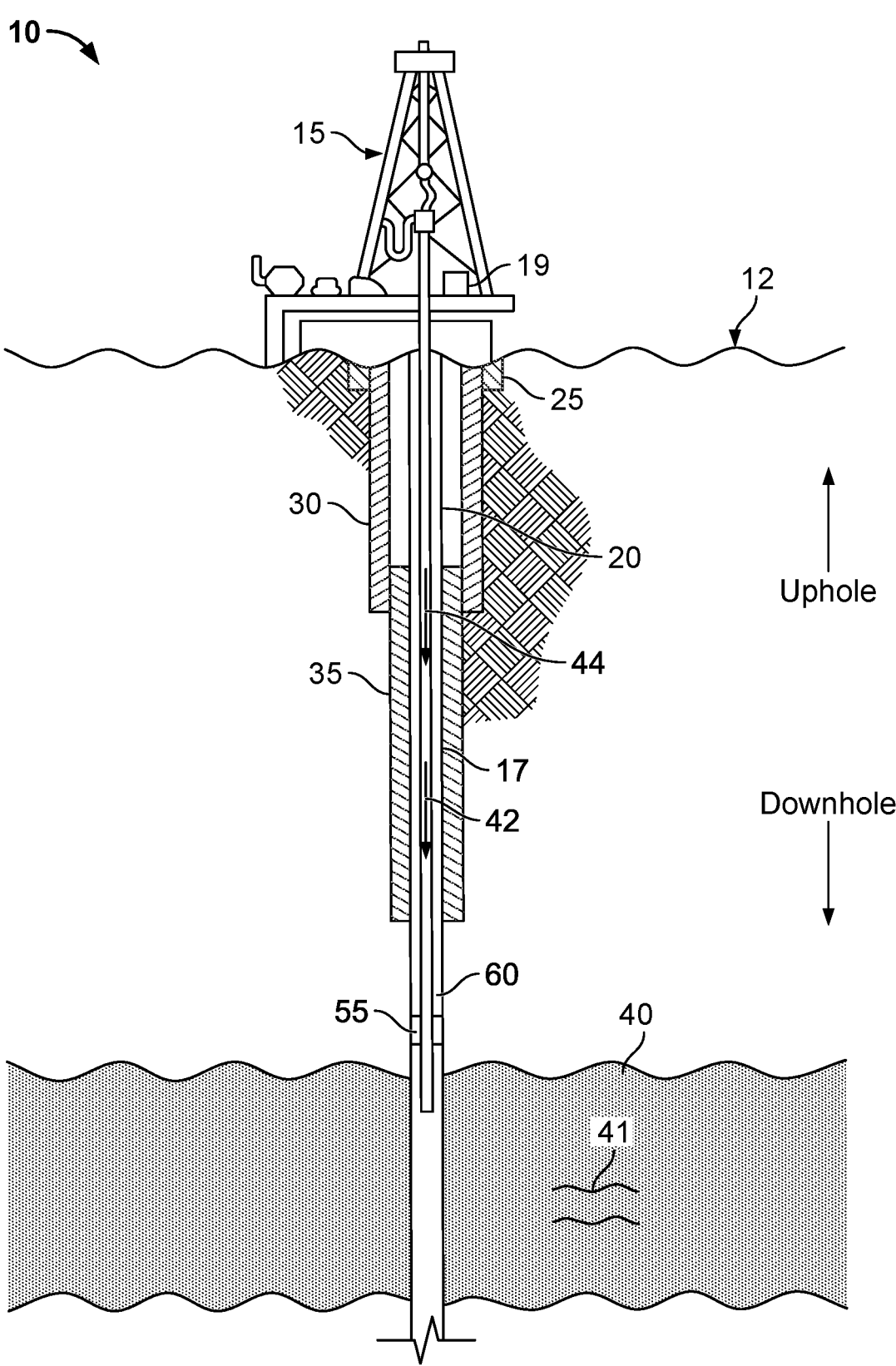
FIG. 1 is a schematic diagram of an example wellbore system for injecting freshwater and carbon dioxide ($CO_2$) into a subterranean formation according to the present disclosure.

FIG. 1 is a schematic diagram of an example well injection system 10 that operates to serially inject (or circulate) a flow of freshwater 42 (for example, water or other liquid that is substantially free of salt or sodium) and then a flow of $CO_2$ fluid 44 (for example, supercritical $CO_2$) into a wellbore 20 to optimize and amount of the $CO_2$ fluid 44 that can be sequestered in a subterranean formation 40. Thus, in this example, well injection system 10 includes fluid circulation components (for example, pumps, downhole tubing strings, wellbore seals, and other components) suitable to circulate both the freshwater 42 and the $CO_2$ fluid 44 into the wellbore 20.

As shown, the well injection system 10 accesses the subterranean formation 40, which comprises a reservoir for the sequestration of the $CO_2$ fluid 44. In example implementations, subterranean formation 40 is or includes a saline reservoir in that a brine fluid 41 is entrained in the pores of the subterranean formation 40. In an example implementation of system 10, the system 10 may also be used for a drilling operation as well as to inject the freshwater 42 and then the $CO_2$ fluid 44. As illustrated in FIG. 1, an implementation of the well injection system 10 includes a surface assembly 15 deployed on a terranean surface 12. The surface assembly 15 can be used to form (for example, drill) the wellbore 20 extending from the terranean surface 12 and through one or more geological formations in the Earth. One or more subterranean formations, such as subterranean zone 40, are located under the terranean surface 12. One or more wellbore casings, such as a surface casing 30 and intermediate casing 35, may be installed in at least a portion of the wellbore 20 (for example subsequent to completion of the drilling operation or some other time).

In some embodiments, the surface assembly 15 may be deployed on a body of water rather than the terranean surface 12. For instance, in some embodiments, the terranean surface 12 may be an ocean, gulf, sea, or any other body of water under which hydrocarbon-bearing formations may be found. In short, reference to the terranean surface 12 includes both land and water surfaces and contemplates forming and developing one or more well injection systems 10 from either or both locations.

Generally, as a drilling system, the surface assembly 15 may be any appropriate assembly or drilling rig used to form wellbores or boreholes in the Earth. The surface assembly 15 may use traditional techniques to form such wellbores, such as the wellbore 20, or may use nontraditional or novel techniques. In some embodiments, the surface assembly 15 may use rotary drilling equipment to form such wellbores. Rotary drilling equipment is known and may consist of a drill string and a drill bit (or bottom hole assembly that includes a drill bit). In some embodiments, the surface assembly 15 may consist of a rotary drilling rig. Rotating equipment on such a rotary drilling rig may consist of components that serve to rotate a drill bit, which in turn forms a wellbore, such as the wellbore 20, deeper and deeper into the ground. Rotating equipment consists of a number of components (not all shown here), which contribute to transferring power from a prime mover to the drill bit itself. The prime mover supplies power to a rotary table, or top direct drive system, which in turn supplies rotational power to the drill string. The drill string 17 is typically attached to the drill bit (for example, as a bottom hole assembly). A swivel, which is attached to hoisting equipment, carries much, if not all of, the weight of the drill string, but may allow it to rotate freely.

The drill string typically consists of sections of heavy steel pipe, which are threaded so that they can interlock together. Below the drill pipe are one or more drill collars, which are heavier, thicker, and stronger than the drill pipe. The threaded drill collars help to add weight to the drill string above the drill bit to ensure that there is enough downward force on the drill bit to allow the bit to drill through the one or more geological formations. The number and nature of the drill collars on any particular rotary rig may be altered depending on the downhole conditions experienced while drilling.

The circulating system of the surface assembly 15 may be an additional sub-system of the surface assembly 15. Generally, the circulating system may cool and lubricate the drill bit, removing the cuttings from the drill bit and the wellbore 20 (for example, through an annulus 60), and coat the walls of the wellbore 20 with a mud type cake. The circulating system consists of drilling fluid, which is circulated down through the wellbore throughout the drilling process. Typically, the components of the circulating system include drilling fluid pumps, compressors, related plumbing fixtures, and specialty injectors for the addition of additives to the drilling fluid. In some embodiments, such as, for example, during a horizontal or directional drilling process, downhole motors may be used in conjunction with or in the drill bit. Such a downhole motor may be a mud motor with a turbine arrangement, or a progressive cavity arrangement, such as a Moineau motor. These motors receive the drilling fluid through the drill string and rotate to drive the drill bit or change directions in the drilling operation.

The circulating system of the surface assembly 15 can also circulate the freshwater 42 through a tubing string 17 that extends through the wellbore 20 and to at or near the subterranean formation 40. In this example illustration, a wellbore seal 55 (for example, a packer) can be used to isolate a portion of the wellbore 20 downhole of the seal 55 so that the freshwater 42 circulated to the subterranean formation 40 does not undesirably return uphole in the annulus 60.

The circulating system of the surface assembly 15 can also circulate the $CO_2$ fluid 44 through the tubing string 17 and to at or near the subterranean formation 40. The wellbore seal 55 can also be used to isolate the portion of the wellbore 20 downhole of the seal 55 so that the $CO_2$ fluid 44 circulated to the subterranean formation 40 does not undesirably return uphole in the annulus 60.

In some embodiments of the well injection system 10, the wellbore 20 may be cased with one or more casings. As illustrated, the wellbore 20 includes a conductor casing 25, which extends from the terranean surface 12 shortly into the Earth. A portion of the wellbore 20 enclosed by the conductor casing 25 may be a large diameter borehole. Additionally, in some embodiments, the wellbore 20 may be offset from vertical (for example, a slant wellbore). Even further, in some embodiments, the wellbore 20 may be a stepped wellbore, such that a portion is drilled vertically downward and then curved to a substantially horizontal wellbore portion. Additional substantially vertical and horizontal wellbore portions may be added according to, for example, the type of terranean surface 12, the depth of one or more target subterranean formations, the depth of one or more productive subterranean formations, or other criteria.

Downhole of the conductor casing 25 may be the surface casing 30. The surface casing 30 may enclose a slightly smaller borehole and protect the wellbore 20 from intrusion of, for example, freshwater aquifers located near the terranean surface 12. The wellbore 20 may than extend vertically downward. This portion of the wellbore 20 may be enclosed by the intermediate casing 35.

In some aspects, the surface assembly 15 (or other portion of the well injection system 10) may include a control system 19, for example, microprocessor-based, electro-mechanical, or otherwise, that may control the circulating system of the well injection system 10. In some aspects, the control system 19 may control one or more pumps, one or more valves, as well as other equipment that is part of or connected to the drilling fluid circulation system, as well as the freshwater and $CO_2$ fluid circulation systems. For example, the control system 19 may control a flow rate, pressure, or other circulation criteria of the freshwater 42, as well as a flow rate, pressure, or other circulation criteria of the $CO_2$ fluid 44. In some aspects, the control system 19 may complete operations that determine an amount of freshwater 42 that is circulated to the subterranean formation 40 prior to circulation of the $CO_2$ fluid 44 into the subterranean formation 40 for sequestration.

The well injection system 10 can be used or controlled to inject the $CO_2$ fluid 44 into the subterranean formation 40 for storage (for example, temporary or permanent) more efficiently than conventional injection systems that suffer from $CO_2$ dry out effect. For example, once the wellbore 20 is formed (which can be much earlier in time than the sequestration operations), and prior to the circulation of the $CO_2$ fluid 44, the well injection system 10 can circulate or inject an amount of freshwater 42 into at least a portion of the subterranean formation 40 that surrounds the wellbore 20. By doing so, the negative impact of $CO_2$ dry-out on permeability can be minimized through the displacement of salt in the brine fluid 41 by the injection of the freshwater 42.

Figure 2:
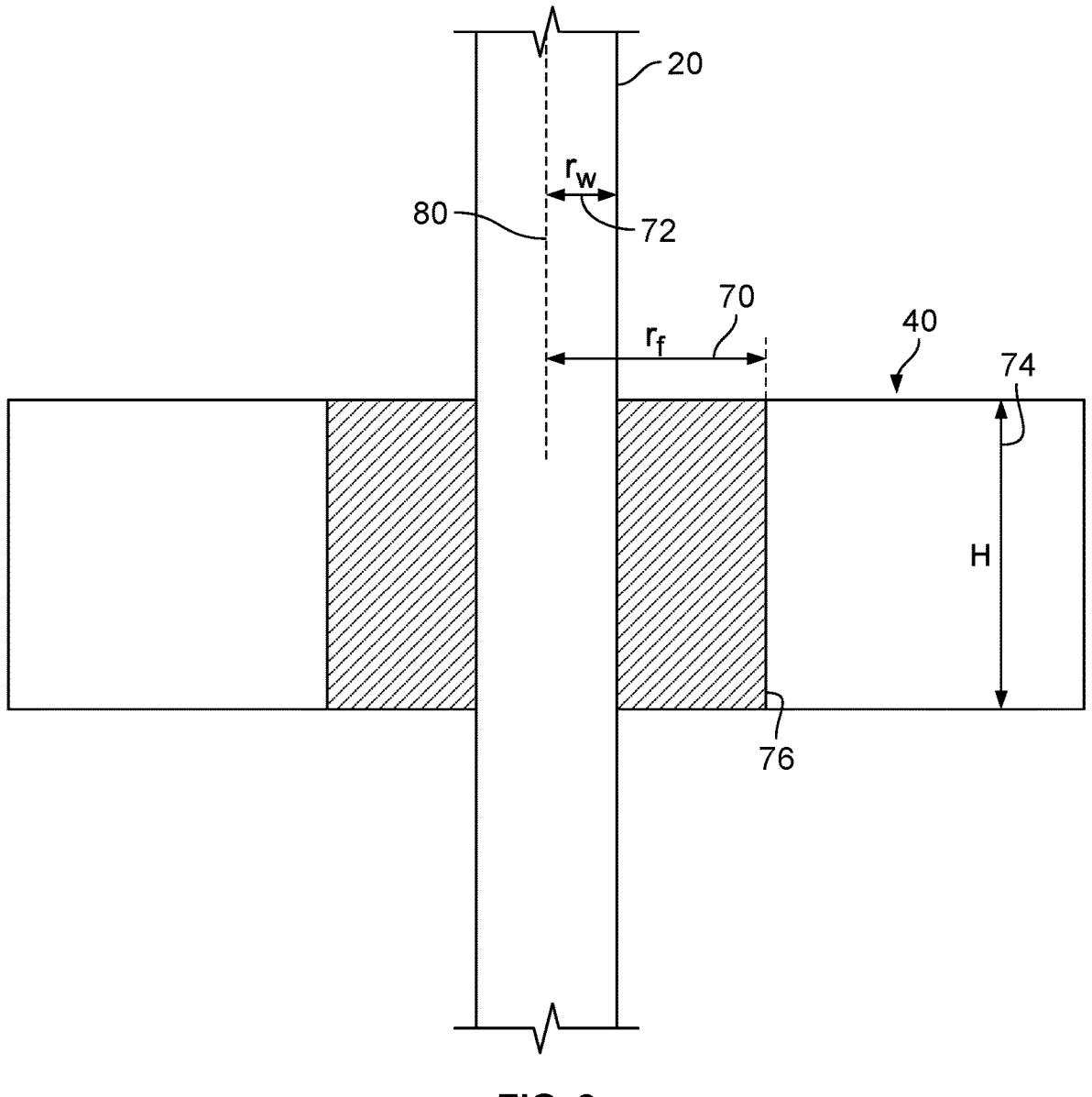
FIG. 2 is a schematic diagram of portion of the wellbore and the subterranean formation into which freshwater and $CO_2$ are injected according to the present disclosure.

For example, turning to FIG. 2, this figure is a schematic diagram of portion of the wellbore 20 and the subterranean formation 40 into which freshwater 42 and $CO_2$ fluid 44 are injected. As shown in this diagram, the wellbore 20 has a radius, $r_w$, 72, and the subterranean formation 40 has a thickness, H, 74. A ring 76 surrounds the wellbore 20 and represents a volume into which a predetermined amount of the freshwater 42 is injected into the subterranean formation 40. This ring 76 has a radius, rf, 70 that represents a distance between a radial centerline (or axis) 80 of the wellbore 20 and a location (outer radius) on the ring 76 at which the freshwater 42 ceases to be entrained within the pores of the subterranean formation 40. In some aspects, the freshwater 42 is obtained by desalting the brine 41 that is pumped from the saline aquifer in the subterranean formation 40 under consideration for $CO_2$ injection and sequestration. This can save pore space for the $CO_2$ fluid 44 that is injected compared with the use of freshwater from other sources than the saline aquifer.

The control system 19 can determine the amount of the freshwater 42 to inject into the subterranean formation 40 to create the freshwater ring 76. This determination can be made based on the geometric characteristics of the wellbore 20 and subterranean formation 40 shown in FIG. 2. For example, the amount or volume of the freshwater 42 can be determined based on the thickness 74 and the radii 70 and 72. For instance, the amount of freshwater 42 injected into the formation 40 can be calculated by the control system 19 according to:

$$V_f = \pi r_w^2 H(n^2 - 1), \qquad \text{Eq. 1}$$

where $V_f$ is the volume of freshwater, $r_w$ is the radius 72 of the wellbore 20, H is the thickness 74 of the subterranean formation 40, and n is a ratio of the radius 72 of the wellbore 20 to the radius 70 of the freshwater ring 76. Typically, n is selected to be between 3 and 7 (as a dimensionless number), which sets the value of the radius 76 (since the value of the radius 72 is known).

Once this volume, Vf, is determined, the well injection system 10 injects the freshwater 42 into the wellbore 20 to create the freshwater ring 76. The injected freshwater 42 only occupies a negligible fraction of pore space for the subterranean formation 40 and thus should not have any impact on $CO_2$ storage capacity of the formation 40. In some aspects, an equivalent amount of water solute can be pumped out of the formation 40, treated by removing solute from the solution, and then reinjected to the saline aquifer. In some aspects, for the freshwater 42 injection step, if the saline aquifer contains swelling clay, a swelling inhibitor can be added into the freshwater 42 to be injected to avoid swelling, which can reduce permeability and thus injectivity.

Subsequent to injection of the freshwater 42, the $CO_2$ fluid 44 (for example, supercritical $CO_2$) is injected into the wellbore 20 by the well injection system 10. In some aspects, the $CO_2$ fluid can be injected immediately are substantially immediately after injection of the freshwater 42, thereby minimizing mixing between the freshwater 42 and the brine 41 in the subterranean formation 40. For instance, the $CO_2$ fluid can be injected between 0 and 2 hours after injection of the freshwater 42.

Within this ring 76, the salt from the brine fluid 41 is displaced, thereby increasing a $CO_2$ injection rate of the $CO_2$ fluid 44. The $CO_2$ injection rate, Q, is based on Darcy's Law:

$$Q = -2\pi r H K \frac{dP}{dr} \qquad \text{Eq. 2}$$

where r is a radial distance from the axis 80, H is the thickness 74, K is hydraulic conductivity, and P is pore pressure. Integrating both sides of Eq. 2 gives:

$$\frac{Q}{2\pi r H K} \ln\left(\frac{r_p}{r_w}\right) = \Delta P = P_w - P_p \qquad \text{Eq. 3}$$

where $r_p$ is a radial distance from the axis 80 to a point in the subterranean formation 40, $r_w$ is the wellbore radius 72, $P_w$ is a pressure at the wellbore 20, and $P_p$ is a pressure at the location, $r_p$.

From Eq. 3, $CO_2$ fluid injectivity, I, can be defined as:

$$I = \frac{Q}{\Delta P} = \frac{2\pi H K}{\ln\left(\frac{r_p}{r_w}\right)}. \qquad \text{Eq. 4}$$

I is a measure of ease of injectivity of the $CO_2$ fluid 44 into the subterranean formation. This follows since an increase in I follows from an increase in Q (for constant $\Delta P$) or a decrease in $\Delta P$ (for constant Q).

In the same way that Eq. 4 can be derived, an injectivity, I*, can be derived and represents injectivity of the $CO_2$ fluid 44 when a prior injection of the freshwater 42 occurs (in other words, prior to the injection of the $CO_2$ fluid 44 into the subterranean formation 40). The derived injectivity, I*, can be determined by:

$$I^* = 2\pi H \left\{ \frac{1}{K_f} \ln\left(\frac{r_f}{r_w}\right) + \frac{1}{K} \ln\left(\frac{r_p}{r_f}\right) \right\}^{-1} \qquad \text{Eq. 5}$$

where $K_f$ is the conductivity of the freshwater ring 76 (and the same as the original conductivity of the subterranean formation 40) and K is the conductivity modified by the $CO_2$ dry-out effect (and thus smaller than $K_f$). For $K_f$ equal to K, Eq. 5 is reduced to Eq. 3. The injectivity ratio can then be defined by dividing Eq. 5 by Eq. 4 as follows:

$$\text{injectivity ratio} = \frac{I^*}{I} = \frac{\frac{K}{K_f}\ln\left(\frac{r_f}{r_w}\right) + \ln\left(\frac{r_p}{r_f}\right)}{\ln\left(\frac{r_p}{r_w}\right)}. \qquad \text{Eq. 6}$$

Eq. 6 shows that injectivity ratio is a measure of the $CO_2$ injectivity enhancement after the brine 41 near the wellbore 20 (in other words, in the freshwater ring 76) is replaced by freshwater 42. This injectivity ratio can be graphically shown as in the graphs of FIGS. 3A and 3B.

Figure 3A:
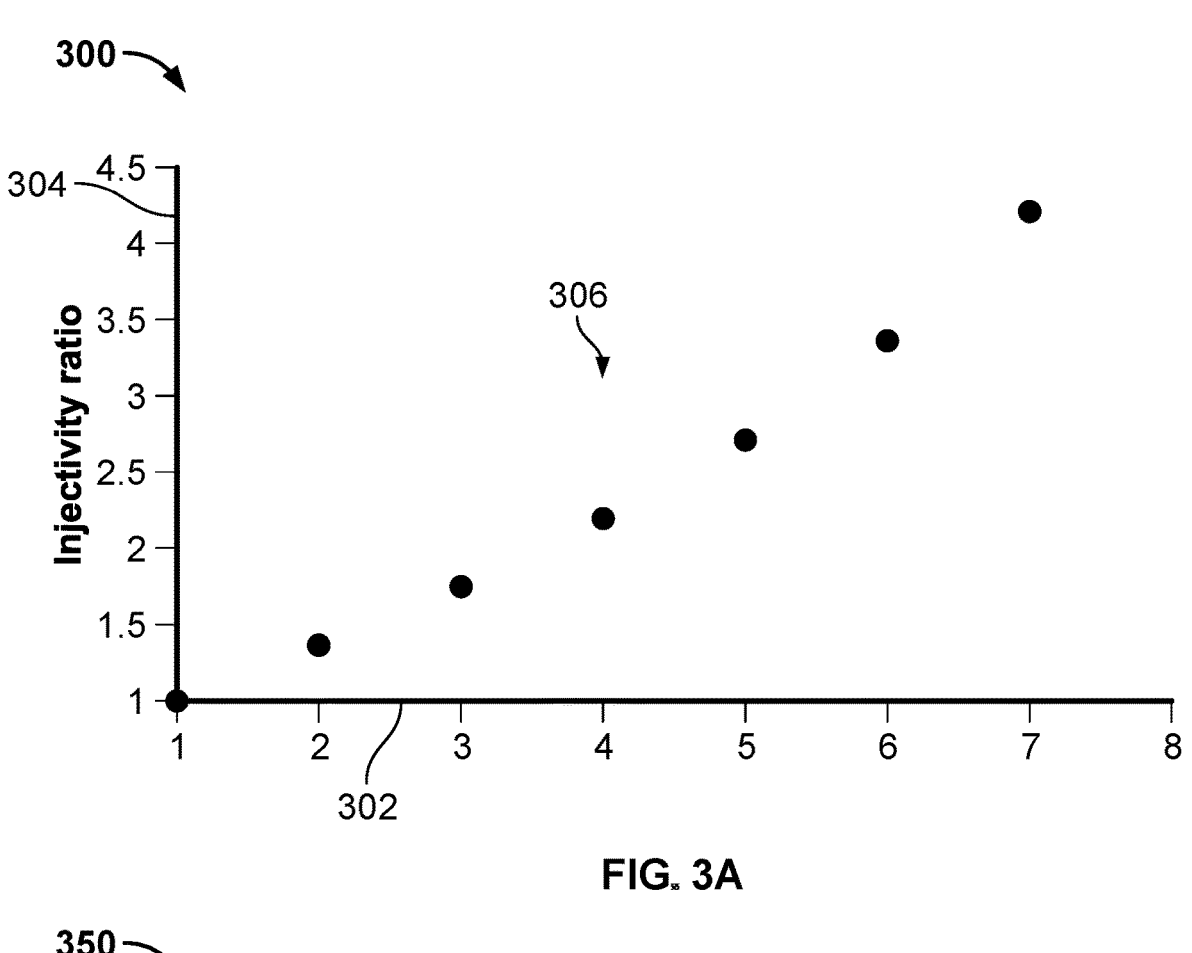
FIG. 3A is a graph showing a $CO_2$ injectivity ratio as a function of well system geometric characteristics according to the present disclosure.

For example, FIG. 3A shows a graph 300 of injectivity ratio on y-axis 304 vs. n (the ratio of radius 70 vs. radius 72) in axis 302. In graph 300, n was selected to vary between dimensionless values of 1 and 7 for $$\frac{r_p}{r_w} = 10$$

and $$\frac{K_f}{K} = 10.$$

Figure 3B:
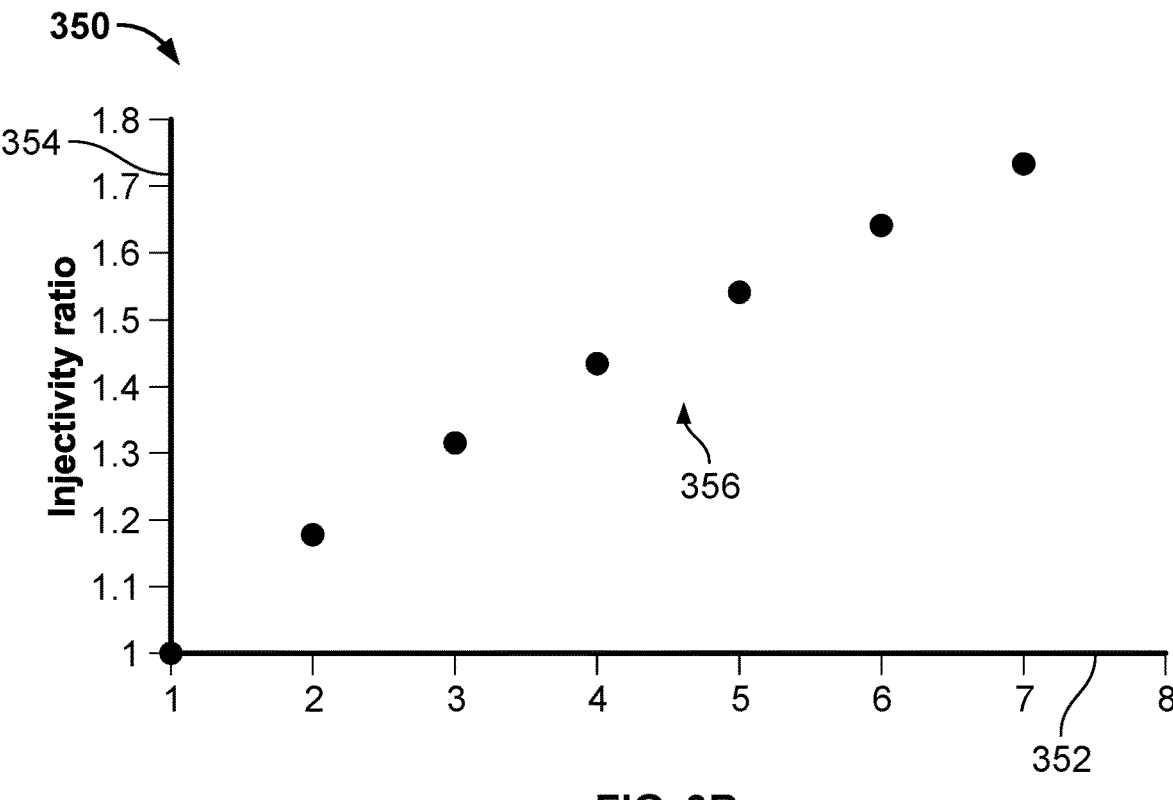
FIG. 3B is a graph showing a $CO_2$ injectivity ratio as a function of well system geometric characteristics according to the present disclosure.

The plot 306 shows that the injectivity ratio increases as the radius 70 of freshwater ring 76 increases. FIG. 3B shows a graph 350 of injectivity ratio on y-axis 354 vs. n (the ratio of radius 70 vs. radius 72) in axis 352. In graph 350, n was selected to vary between dimensionless values of 1 and 7 for $$\frac{r_p}{r_w} = 10$$

and $$\frac{K_f}{K} = 2.$$

The plot 356 also shows that the injectivity ratio increases as the radius 70 of freshwater ring 76 increases.

Taken together, graphs 300 and 350 show that the injection of freshwater 42 prior to the injection of $CO_2$ fluid 44 can significantly enhance the injectivity of the $CO_2$ fluid 44 for sequestration purposes. For example, for $$\frac{r_f}{r_w} = 4,$$

the injectivity is enhanced by more than 100% in graph 300 and 40% in graph 350. And while it is desirable to displace as much brine 41 near the wellbore 20 as possible for enhancing the injectivity of the $CO_2$ fluid 44, the amount of injected freshwater 42 is limited, in practice, by cost associated with replacing brine 41 and by the consideration to leave more pore space to store the $CO_2$ fluid 44. In some aspects, therefore, and $$\frac{r_f}{r_w}$$

between 3 and 7 can be reasonable for practical applications, because in this case the injected freshwater 42 only occupies a negligible fraction of pore space of the subterranean formation 40.

Figure 4:
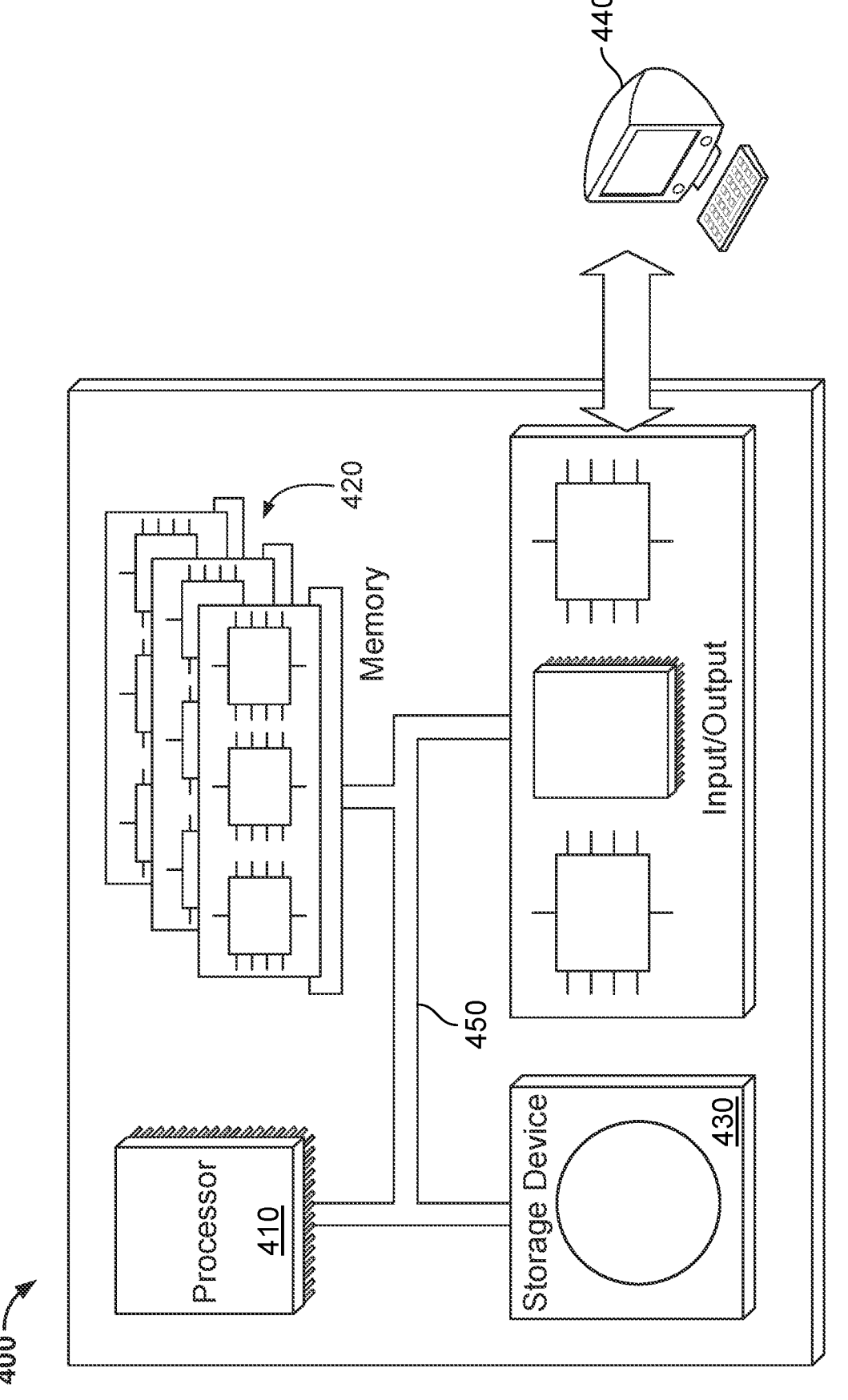
FIG. 4 is a schematic illustration of an example controller (or control system) for a wellbore system according to the present disclosure.

FIG. 4 is a schematic illustration of an example controller 400 (or control system) for controlling operations of a well injection system according to the present disclosure. For example, the controller 400 may include or be part of the control system 19 shown in FIG. 1 for the autonomous robot 200. The controller 400 is intended to include various forms of digital computers, such as printed circuit boards (PCB), processors, digital circuitry, or otherwise parts of a biocide testing system. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The controller 400 includes a processor 410, a memory 420, a storage device 430, and an input/output device 440. Each of the components 410, 420, 430, and 440 are interconnected using a system bus 450. The processor 410 is capable of processing instructions for execution within the controller 400. The processor may be designed using any of a number of architectures. For example, the processor 410 may be a CISC (Complex Instruction Set Computers) processor, a RISC (Reduced Instruction Set Computer) processor, or a MISC (Minimal Instruction Set Computer) processor.

In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the controller 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the controller 400. In one implementation, the storage device 430 is a computer-readable medium. In various different implementations, the storage device 430 may be a floppy disk device, a hard disk device, an optical disk device, or a tape device.

The input/output device 440 provides input/output operations for the controller 400. In one implementation, the input/output device 440 includes a keyboard and/or pointing device. In another implementation, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, for example, in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touchscreen flat-panel displays and other appropriate mechanisms.

The features can be implemented in a control system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

A number of implementations have been described. Nevertheless, it will be understood that various modifications may be made without departing from the spirit and scope of the disclosure. For example, example operations, methods, or processes described herein may include more steps or fewer steps than those described. Further, the steps in such example operations, methods, or processes may be performed in different successions than that described or illustrated in the figures. Accordingly, other implementations are within the scope of the following claims.

What is claimed is:

1. A method, comprising:
identifying a wellbore that extends from a terranean surface and to a subterranean formation that comprises a saline aquifer;
injecting, through the wellbore, a predetermined volume of freshwater into a portion of the saline aquifer adjacent the wellbore to create a freshwater ring about the wellbore in the subterranean formation; and
subsequent to injecting the predetermined volume of freshwater, injecting a carbon dioxide ($CO_2$) fluid, through the wellbore, and into the subterranean formation into which the predetermined volume of freshwater was injected for sequestration.

2. The method of claim 1, further comprising drilling the wellbore from the terranean surface to the subterranean formation.

3. The method of claim 1, wherein injecting the $CO_2$ fluid occurs prior to substantial mixing of the predetermined volume of freshwater with a brine fluid in the saline aquifer.

4. The method of claim 3, further comprising deriving the volume of freshwater by desalting at least a portion of the brine fluid that is pumped from the saline aquifer.

5. The method of claim 1, further comprising determining the volume of freshwater based on a plurality of geometric characteristics of the wellbore and the subterranean formation.

6. The method of claim 5, wherein the plurality of geometric characteristics of the wellbore and the subterranean formation comprise a geometric characteristic of the wellbore, a first geometric characteristic of the subterranean formation, and a second geometric characteristic of the subterranean formation.

7. The method of claim 6, wherein the geometric characteristic of the wellbore comprises a radius of the wellbore, a first geometric characteristic of the subterranean formation comprises a radius of the freshwater ring, and the second geometric characteristic of the subterranean formation comprises a thickness of the subterranean formation.

8. The method of claim 7, wherein determining the volume of freshwater comprises solving:

$$V_f = \pi r_w^2 H(n^2 - 1),$$

where $V_f$ is the volume of freshwater, $r_w$ is the radius of the wellbore, H is the thickness of the subterranean formation, and n is a ratio of the radius of the wellbore to the radius of the freshwater ring.

9. The method of claim 8, wherein n is a dimensionless number between 3 and 7.

10. The method of claim 8, further comprising calculating an injectivity ratio as a function of n, where the injectivity ratio is a measure of an ease of injection of the $CO_2$ fluid into the subterranean formation subsequent to injecting the predetermined volume of freshwater to an ease of injection of a $CO_2$ fluid into the subterranean formation exclusive of injecting the predetermined volume of freshwater.

11. The method of claim 10, wherein calculating the injectivity ratio comprises solving:

$$\text{injectivity ratio} = \frac{I^*}{I} = \frac{\frac{K}{K_f}\ln\left(\frac{r_f}{r_w}\right) + \ln\left(\frac{r_p}{r_f}\right)}{\ln\left(\frac{r_p}{r_w}\right)},$$

where I* is the ease of injection of the $CO_2$ fluid into the subterranean formation subsequent to injecting the predetermined volume of freshwater, I is the ease of injection of a $CO_2$ fluid into the subterranean formation exclusive of injecting the predetermined volume of freshwater, K is a conductivity of the subterranean formation adjusted for a $CO_2$-dryout effect, $K_f$ is a conductivity of the subterranean formation, and $r_p$ is a radial distance from a radial center of the wellbore to a point in the subterranean formation.

12. The method of claim 11, wherein $K_f/K$ is a dimensionless number between 2 and 10, and $r_p/r_w$ is a dimensionless number of 10.

13. The method of claim 1, wherein the $CO_2$ fluid is supercritical $CO_2$.

14. A system, comprising:

a freshwater circulation system configured to circulate freshwater into a wellbore formed from a terranean surface and to a subterranean formation that comprises a saline aquifer;

a carbon dioxide ($CO_2$) circulation system configured to circulate a $CO_2$ fluid into the wellbore and to the subterranean formation; and a control system configured to perform operations comprising:

determining a volume of freshwater sufficient to create a freshwater ring about the wellbore in the subterranean formation;

causing the freshwater circulation system to circulate the determined volume of freshwater into the subterranean formation; and causing the $CO_2$ circulation system to circulate, subsequent to circulation of the determined volume of freshwater, an amount of the $CO_2$ fluid into the subterranean formation into which the predetermined volume of freshwater was injected for sequestration.

15. The system of claim 14, wherein the control system causes the $CO_2$ circulation system to circulate the amount of $CO_2$ fluid into the subterranean formation prior to substantial mixing of the determined volume of freshwater with a brine fluid in the saline aquifer.

16. The system of claim 15, wherein the volume of freshwater is derived by desalting at least a portion of the brine fluid that is pumped from the saline aquifer.

17. The system of claim 15, wherein the operation of determining the volume of freshwater comprises determining the volume of freshwater based on a plurality of geometric characteristics of the wellbore and the subterranean formation.

18. The system of claim 17, wherein the plurality of geometric characteristics of the wellbore and the subterranean formation comprise a geometric characteristic of the wellbore, a first geometric characteristic of the subterranean formation, and a second geometric characteristic of the subterranean formation.

19. The system of claim 18, wherein the geometric characteristic of the wellbore comprises a radius of the wellbore, a first geometric characteristic of the subterranean formation comprises a radius of the freshwater ring, and the second geometric characteristic of the subterranean formation comprises a thickness of the subterranean formation.

20. The system of claim 19, wherein the operation of determining the volume of freshwater comprises solving:

$$V_f = \pi r_w^2 H(n^2 - 1),$$

where $V_f$ is the volume of freshwater, $r_w$ is the radius of the wellbore, H is the thickness of the subterranean formation, and n is a ratio of the radius of the wellbore to the radius of the freshwater ring.

21. The system of claim 20, wherein n is a dimensionless number between 3 and 7.

22. The system of claim 20, wherein the operations further comprise calculating an injectivity ratio as a function of n, where the injectivity ratio is a measure of an ease of injection of the $CO_2$ fluid into the subterranean formation subsequent to injecting the predetermined volume of freshwater to an ease of injection of a $CO_2$ fluid into the subterranean formation exclusive of injecting the predetermined volume of freshwater.

23. The system of claim 22, wherein calculating the injectivity ratio comprises solving:

$$\text{injectivity ratio} = \frac{I^*}{I} = \frac{\frac{K}{K_f}\ln\left(\frac{r_f}{r_w}\right) + \ln\left(\frac{r_p}{r_f}\right)}{\ln\left(\frac{r_p}{r_w}\right)},$$

where $I^*$ is the ease of injection of the $CO_2$ fluid into the subterranean formation subsequent to injecting the predetermined volume of freshwater, $I$ is the ease of injection of a $CO_2$ fluid into the subterranean formation exclusive of injecting the predetermined volume of freshwater, $K$ is a conductivity of the subterranean formation adjusted for a $CO_2$-dryout effect, $K_f$ is a conductivity of the subterranean formation, and $r_p$ is a radial distance from a radial center of the wellbore to a point in the subterranean formation.

24. The system of claim 23, wherein $K_f/K$ is a dimensionless number between 2 and 10, and $r_p/r_w$ is a dimensionless number of 10.

25. The system of claim 14, wherein the $CO_2$ fluid is supercritical $CO_2$.

26. A method, comprising:

identifying a wellbore that extends from a terranean surface and to a subterranean formation that comprises a saline aquifer;

determining a volume of freshwater based on a plurality of geometric characteristics of the wellbore and the subterranean formation, wherein the plurality of geometric characteristics of the wellbore and the subterranean formation comprise a geometric characteristic of the wellbore, a first geometric characteristic of the subterranean formation, and a second geometric characteristic of the subterranean formation;

injecting, through the wellbore, the predetermined volume of freshwater into a portion of the saline aquifer adjacent the wellbore to create a freshwater ring about the wellbore in the subterranean formation, the geometric characteristic of the wellbore comprising a radius of the wellbore, the first geometric characteristic of the subterranean formation comprising a radius of the freshwater ring, and the second geometric characteristic of the subterranean formation comprising a thickness of the subterranean formation; and subsequent to injecting the predetermined volume of freshwater, injecting a carbon dioxide ($CO_2$) fluid, through the wellbore, and into the subterranean formation for sequestration.

\* \* \* \* \*